Feb. 22, 1944.   W. B. KLEMPERER   2,342,587
METHOD OF AND MEANS FOR INDICATING PRESSURE
Original Filed Dec. 22, 1936   4 Sheets-Sheet 1

Inventor
Wolfgang B. Klemperer
R. H. Wales
By
Attorney

Feb. 22, 1944. W. B. KLEMPERER 2,342,587
METHOD OF AND MEANS FOR INDICATING PRESSURE
Original Filed Dec. 22, 1936 4 Sheets-Sheet 2

Inventor
Wolfgang B. Klemperer
R. H. Walters
By
Attorney

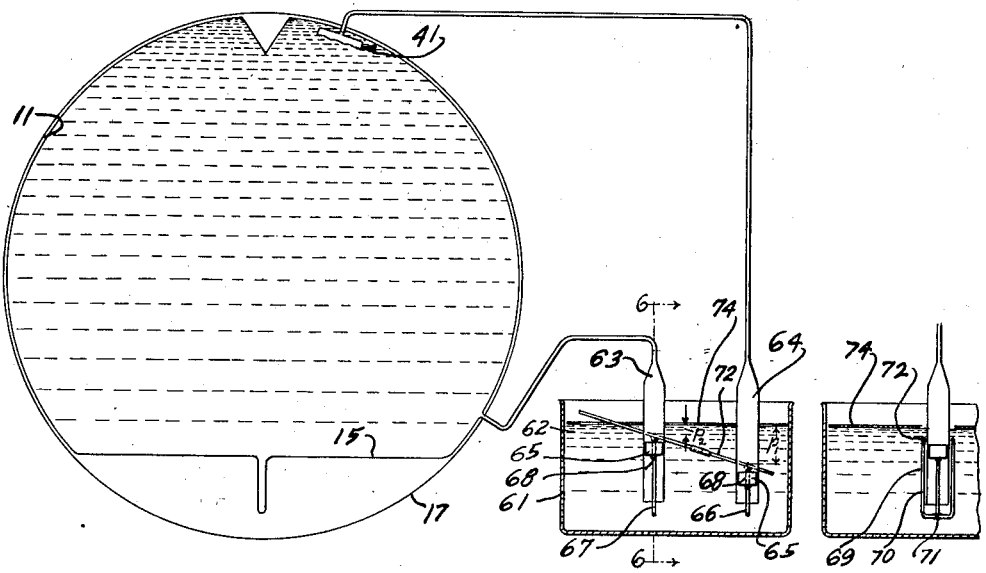
Fig. 5
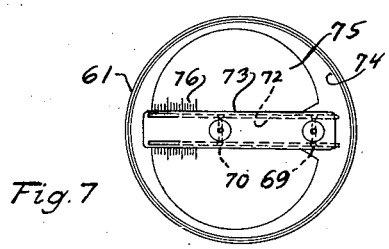
Fig. 6
Fig. 7
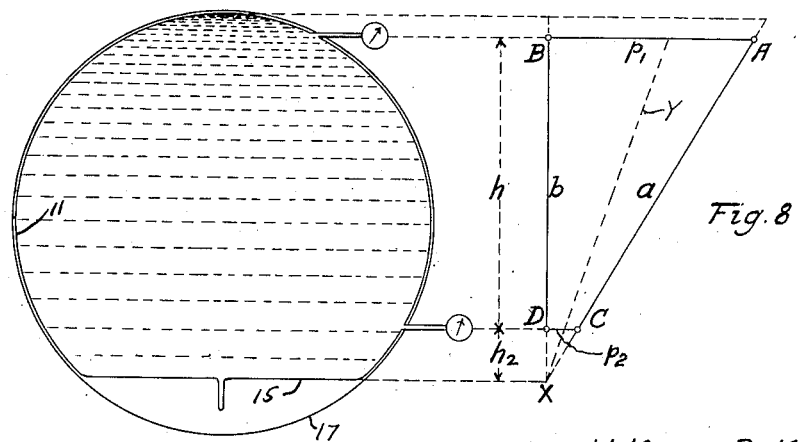
Fig. 8
Inventor
Wolfgang B. Klemperer
R. H. Waters
By
Attorney Feb. 22, 1944. W. B. KLEMPERER 2,342,587
METHOD OF AND MEANS FOR INDICATING PRESSURE
Original Filed Dec. 22, 1936 4 Sheets-Sheet 4

Inventor
Wolfgang B. Klemperer
R. H. Waters
By
Attorney

Patented Feb. 22, 1944

2,342,587

UNITED STATES PATENT OFFICE 2,342,587

METHOD OF AND MEANS FOR INDICATING PRESSURES

Wolfgang B. Klemperer, West Los Angeles, Calif., assignor to Wingfoot Corporation, Wilmington, Del., a corporation of Delaware Continuation of application Serial No. 117,141, December 22, 1936. This application June 9, 1941, Serial No. 397,177

7 Claims. (Cl. 73—31)

The present invention relates to a means and method for determining and indicating various functional characteristics of a gas-filled cell used in airships, particularly of the rigid type. This application is a continuation of my application Serial No. 117,141 filed December 22, 1936, for Method of and means for indicating pressures.

One object of this invention is to provide means and method for indicating the potential lift of the gas contained within a gas cell as compared with the density of the surrounding air. In other words, this means may be utilized regardless of the elevation at which the airship is flying.

Another object of this invention is to indicate the fullness of the gas cell.

Still another object of this invention is to provide means for indicating the potential lift of the gas within a cell corrected for all known physical conditions affecting the lift.

Other objects of this invention will appear hereinafter as the description thereof proceeds, the novel features, arrangements and combinations being clearly set forth in the specification and in the claims hereunto appended.

In airship operation it is of great importance to the pilot to be always informed about changes in gas conditions of all cells in the ship. For instance, he wants to know how much gas has been lost, either through leakage or through automatic valving when the airship travels near or above the pressure height, or through change in meteorological conditions, so that he is always aware of how much potential buoyancy may have been lost. The pressure height is the altitude at which the gas has expanded to the point of occupying the entire available gas cell volume. Of course this pressure height is a relative matter and bears relation to the outside pressure and to temperature variations. If the ship is carried to a greater height by dynamic forces due to the motion of the ship, the gas in the cells is valved off. Therefore, when the ship returns to a lower level it becomes quite important to determine how much gas has been lost or valved off.

The amount of gas actually escaped from a container is measured by the absolute weight or mass of this escaped gas rather than by any other physical observable change such as the fullness of the container or the pressure exerted upon its wall at one definite place. The reason is that volume and local pressure are subject to change by other causes than loss of gas, for instance, a change of purity through leakage of air into the container or a change of temperature of the gas or a change of barometric pressure of the air. The latter may change with the weather and, aboard the airship, also with the altitude of flight.

The present invention is based upon a complete appraisal of all thermodynamical phenomena involved there. As it implies apparatus taking cognizance of all these extraneous influences, it also furnishes knowledge of such other interesting characteristics of the container as its instantaneous fullness, the purity of the gas and the wall pressure at any point.

Such complete information is not conveyed by any component element alone. Especially, the mere provision of a manometer connected at one station of a gas cell, such as has been the custom on airships for more than 20 years, is not a means to distinguish whether any change of the measured quantity is due to loss of gas or to the mere expansion of the gas in a container of a limited contour, for instance while the ship climbs to higher altitudes or experiences a change of temperature. Also the provision of a pressure gauge which measures the absolute pressure of the gas against vacuum like an aneroid barometer is inadequate to throw any light upon the question whether gas has escaped from the container or upon the question as to how much buoyancy or lift the gas in the container furnishes.

To throw the burden of complicated thermodynamical calculations upon the shoulders of the pilot of the craft may preclude his obtaining the desired knowledge in time to meet an emergency, especially in case of a sudden damage to a gas cell if not immediately reported. It is therefore contended that an instrument directly indicating any loss or contamination of gas is a valuable asset.

For a better understanding of the invention reference will now be had to the accompanying diagrammatic drawings in which Figure 1 is a perspective transverse cross-sectional view, somewhat diagrammatic, of an airship provided with two liquid manometers attached to the gas cell for measuring at two levels the gas pressure against the atmosphere;

Figure 5 is a diagrammatic transverse cross-sectional view of an airship provided with a liquid gas level indicator;

Figure 6 is a cross-sectional view of this indicator shown in Figure 5, taken along the line 6—6 of that figure.

Figure 7 is a plan view of the indicator shown in Figures 5 and 6;

Figure 8 is a diagram indicating the gas pressure at two levels of a gas cell and with the lowest gas level deduced therefrom;

Figure 1:
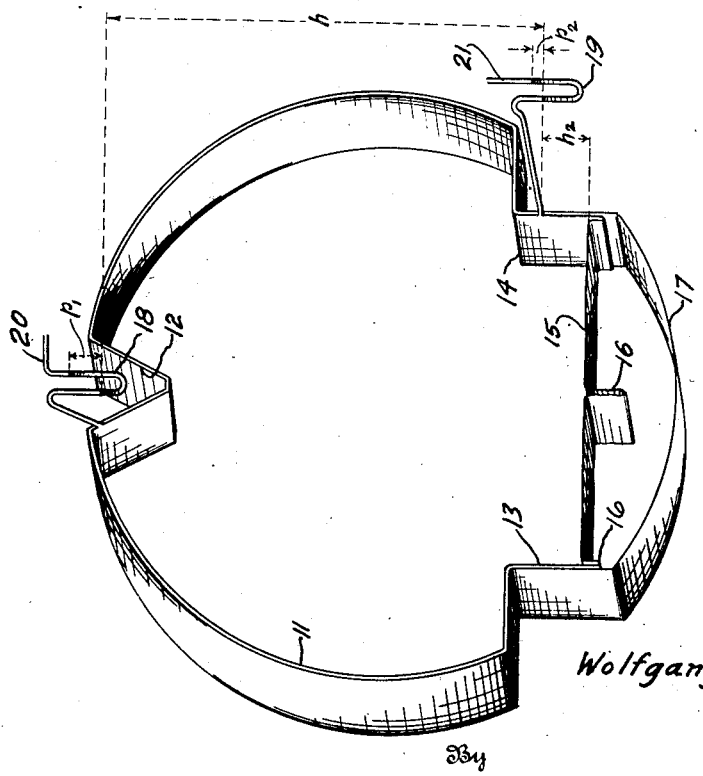

Referring now to Figure 1, the gas cell 11 may be of any geometrical shape, but is here assumed to be essentially cylindrical except for three recesses, 12, 13 and 14, provided, for instance, to accommodate gangways. This cell has a flexible fabric bottom part 15, which floats at a level where the pressures of gas inside and air outside are equal. The surplus of the fabric arranges itself in a fold 16, capable of unfolding for expansion of the container as far as limited by the solid frame or shell 17. This view refers to a container for a gas lighter than air. If the gas is heavier than air the picture is simply inverted. An essential part of the present invention consists in the arrangement of two manometers 18 and 19, one in the upper part of the gas cell and the other in the lower part with a known level difference $h$. The manometers may be of the liquid U-tube type as shown or of the sprung diaphragm or Bourdon type. The back sides 20 and 21 of the manometers (i. e., the legs of the U-tubes not connected to the gas cell or the case containing the capsule or active element of an elastic mechanical pressure gauge) are open to the same atmosphere.

The difference of head $p_1-p_2$ in lbs./sq. ft. shown between the two manometers divided by the level difference $h$ in feet between them is exactly equal to the buoyancy of the gas in the air in lbs./cu. ft., viz., the difference of the specific weights of the air and gas. This is one quantity of interest to the pilot of an airship. The first step of this invention, consequently, consists in a device indicating the difference between two manometers arranged at a fixed level difference $h$. The values $p_1$ and $p_2$ are the absolute pressures at the two levels minus the adjacent outside pressures at the two levels. The pressure difference of the air near the top and bottom of the cell has the same value in any connecting airline as in the free atmosphere, namely in accordance with the barometric pressure gradient.

Figure 2:
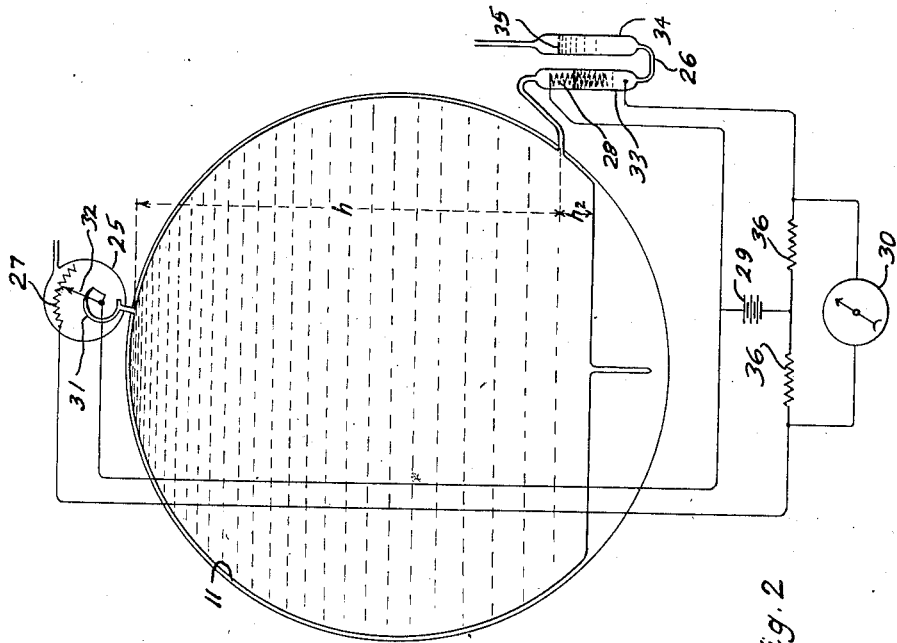
Figure 2 is a view similar to Figure 1, but with the addition of an electric remote gas level indicator.

One solution of this problem consists in equipping the manometers 25 and 26 (Figure 2) with (commercially available) electric remote indicating devices, for instance, by providing rheostats 27 and 28, respectively, operatively connected to each manometer and forming part of an electrical circuit containing a source of electricity 29, and an electric indicator or voltmeter 30. The rheostats 27 and 28 of the two manometers are differentially connected in the electrical circuit, for instance, as adjacent branches in a Wheatstone bridge as shown in Figure 2. The rheostats may be operated mechanically, 27, as shown in connection with the mechanical manometer 25, having a diaphragm or Bourdon element 31 and a hand 32, or they may be operated hydraulically, 28, as shown in connection with the liquid manometer, 26 having two legs 33 and 34 filled with an electrical conducting liquid, 35, whose rise or fall shorts varying lengths of the rheostat 28. Items 36 are the other fixed resistances of the bridge.

Figure 3:
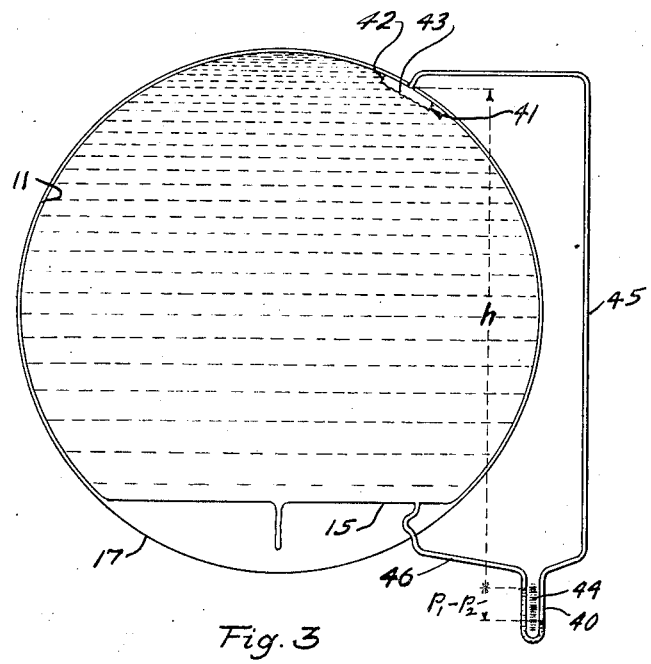
Figure 3 is a diagrammatic transverse cross-sectional view of an airship with a differential manometer attached to a gas cell.
Figure 4:
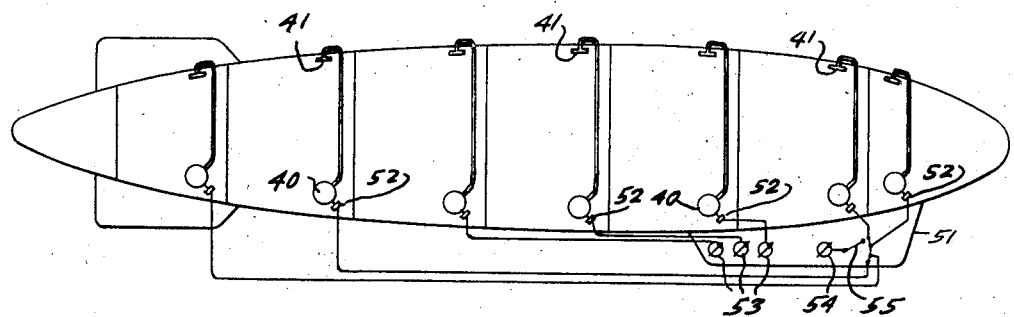
Figure 4 is a longitudinal cross-sectional view of an airship, somewhat diagrammatic, illustrating different arrangements of remote indication of the gas conditions in the various gas cells.

A second solution of the same principle is pictured in Figure 3. Here the transmission between the two manometer-levels is not electrical but pneumatical. The two pressure heads are thus brought to each other and their difference is directly indicated by a single manometer 40 which may again be either of the liquid type as shown, or of the mechanical type having an elastic diaphragm member. Here the top manometer is shown replaced by a pressure transmitter 41 consisting, for instance, of a vessel 42 closed by a slack diaphragm 43 and filled with atmospheric air. The manometer 40 has one leg connected to the transmitter 41 by a sealed tubing 45, and its other leg communicates by means of a tubing 46 with the interior of the gas cell 11 at its lower portion. The diameter of the air tubing 45 is to be very small and the diaphragm 43 is made sufficiently slack to effect the desired pressure transmission while avoiding contact with the rear wall of vessel 42 when the airship rises. Whether the transmitter 41 is really on top and the manometer on the bottom, or vice versa, is immaterial. The gauge may be graduated at 44 in units of buoyancy (lbs./cu. ft.). If it is desired to indicate this buoyancy at a remote station, for instance, in the control car 51, for many gas cells, the manometers 40 can be equipped with electrical or other remote transmitting devices 52 and either a row of individual indicators 53, or a common indicator 54, with a selector switch 55, as shown on Figure 4.

Once two pressure differences are known, it is possible to determine the height of the free gas level 15. For instance, its height below the lower manometer is expressed by $h_2 = hp_2/(p_1-p_2)$ as is readily seen from the hydrostatic pressure head diagram, Figure 8.

The second step of the present invention consists in the combination of two manometers, one sensitive to the difference between gas heads in two levels and the other sensitive to the local pressure difference between the gas inside and the air outside at one of the levels, preferably the lower level which is usually more accessible. The two instruments are connected to each other by any one of the devices known as ratio meters. The latter indicates the ratio of their individual values. Its scale is graduated in terms of height of the free gas level, and since the latter for any given shape of the frame or shell 17, which limits the expansion of the gas cell, determines the fullness of the available space, it may also be graduated in per cent of fullness or in cubic feet of volume.

The working theory of the combination manometer is clearly demonstrated by the Figures 5 to 8, inclusive. Since the pressure difference of the gas in the cell 11 against the air outside increases from zero at the lower gas level 15 to its maximum at the top at practically the same ratio, the line AC between the two pressure heights $p_1$ and $p_2$ is practically straight and therefore its intersection with the line BD (indicating the outside air pressure) at the point $x$ indicates the zero pressure level of the gas in the cell. Line Y indicates the pressure gradient line for a gas of different characteristics and illustrates that the fullness of the cell is indicated regardless of the type or condition of the gas as the upper and lower pressures are always proportional.

In Figure 5 the combination manometer consists of a vessel 61 containing liquid 62 in which the two manometers 63 and 64 connected to the gas cell 11 at two different gas levels are immersed. Floats 65 moving in the manometers are provided with rods 66 and 67, which are swivelably mounted on the floats at 68 and on the U-shaped supports 69 and 70 at 71. The supports are carrying at both sides of the manometers longitudinally self-adjusting rods 72, which pass through a slot 73 of a floatable indicator plate 74, the outer edge of which conforms to the inside diameter of the vessel 61. It is obvious that the position of the rods, due to the two different gas pressures, corresponds to the line AX. The intersection of the rods and of the indicator plate is identical with the point X, or with the lowest gas level in the cell. On the indicator plate on both sides of the slot a picture 75 of the gas cell is drawn and on scales 76 the fullness in per cent and the volume in cubic feet, respectively, of the gas cell are marked. Thus the correct gas content in the cell can be directly read on the scales. It must be said, however, that the application of liquid manometers would not be very practical, because of the movements of the airship in flight. Therefore, this particular arrangement should be considered mainly as a device by which the working principle of the combination-manometer indicator system could be explained.

Figures 9, 10:
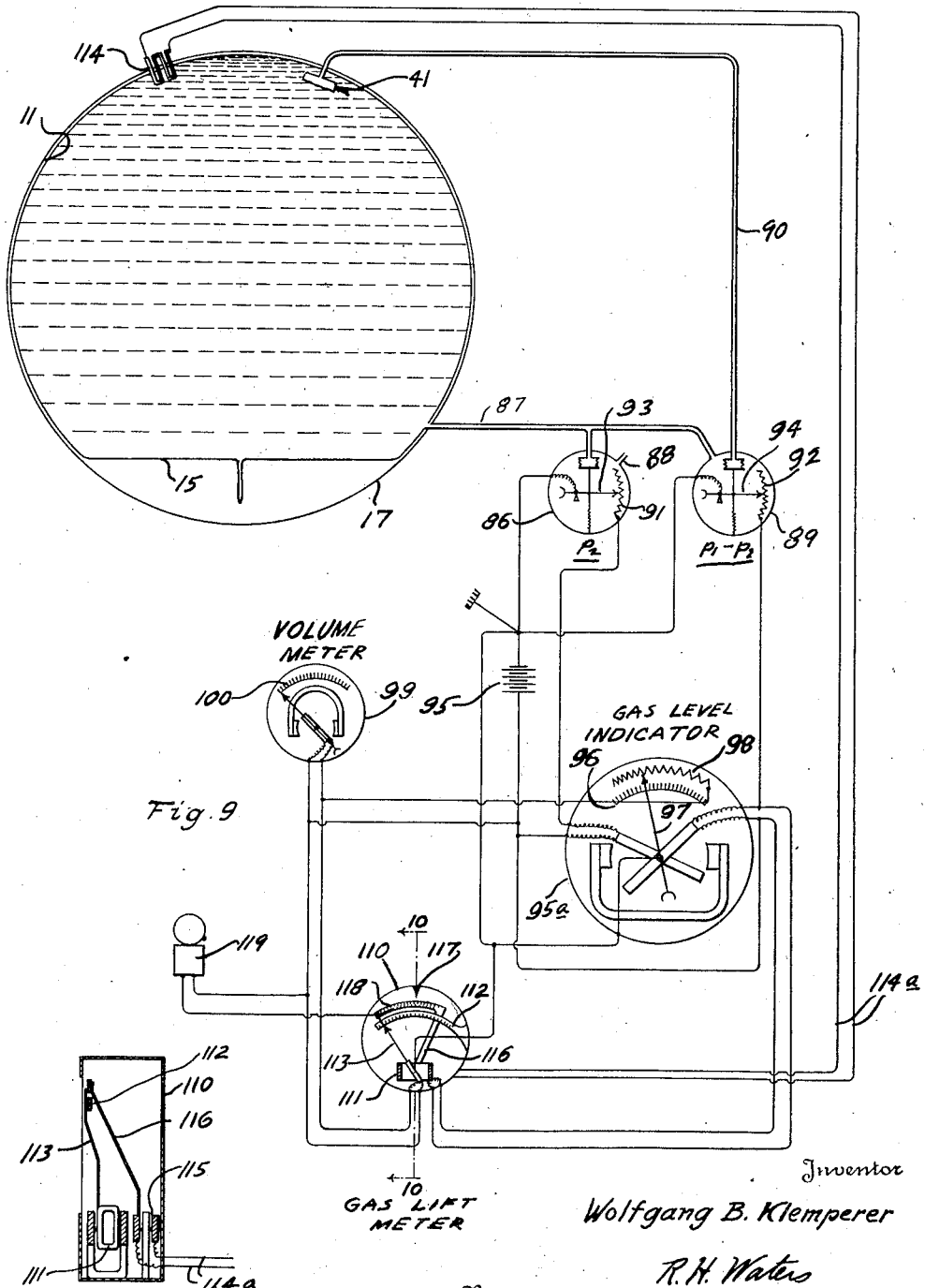
Figure 9 is a diagrammatic transverse cross-sectional view of an airship provided with two gas pressure indicators including the necessary instruments for indicating the bottom gas level, the gas volume, the gas lift, the gas loss and the gas superheat.
Figure 10 is a cross-sectional view of item 110 in Figure 9 taken along the line 10—10 of that figure.

Another construction of a gas level indicator having electric remote indication more directly adapted for airships is illustrated in Figures 9 and 10, in combination with additional separate instruments, which include a gas volume indicator and a lift indicator, both electrically connected with the gas level indicator. The lift of the gas enclosed in a cell would be constant if it always had the temperature of the air outside. If there is a temperature difference, the lift is increased 1% for each 4.9° F. of increased temperature. On that account a temperature meter is combined with the lift indicator to indicate the "potential lift" referred to zero temperature which is really proportional to the mass of gas present in the cell. In addition, a sounding signal may be added, which gives warning, as soon as the loss of gas is exceeding a certain limit.

The manometer 86, with one side connected by a tubing 87 to the lower portion of the gas cell 11, is open at 88 and communicates with the atmosphere to indicate the pressure difference between the gas in the cell and the atmosphere or the value $p_2$. Another pressure-indicating manometer 89 communicates with its high-pressure side, by a tubing 90, with a pressure transmitter 41, at the top of the gas cell 11, and at its low-pressure side with the high-pressure side of the manometer 86, thus showing the pressure difference between the two gas levels or the value $p_1 - p_2$. Thus from these values the value $h_2$ may be determined by the formula $h_2 = h p_2/(p_1 - p_2)$. The manometers 86 and 89 are provided with electrical transmitters, here shown in the form of rheostats 91 and 92, respectively, which are in contact with the pivoted hands 93 and 94. The rheostats 91 and 92, properly calibrated, are electrically connected to the battery 95 and to a cross coil ratio meter 95ª which is provided with a scale 96 and a hand 97, indicating the gas level in the gas cell. A rheostat 98, calibrated in conformity to the volume of the gas cell corresponding to the height of the gas level, regulates the current flowing through the hand 97 to the volume meter 99, which is a regular voltmeter provided with a scale 100, indicating the gas cell volume in cubic feet. In other words, as the cross sectional shape of the gas cell is known, the gas volume is a direct function of the gas level and the scale 100 is merely calibrated in terms of gas volume instead of gas level as with the scale 96. Thus the volume meter scale 100 could be combined with the gas level indicator, 95a.

The next step is to combine the result obtained on the volume meter with that of the specific lift meter 89 in the instrument 110, the main part of which consists of a watt meter 111 having a fixed scale 112 and a hand 113 indicating the gas lift in lbs. per gas cell. Owing to variation in temperature of the lifting gas and of the outside air, the actual lift is reduced to the potential lift at zero differential temperature. This result is obtained by temperature-sensitive elements, for instance, a series of thermo-couples 114 mounted on the airship hull with one series of its junctions exposed to the temperature of the lifting gas and the other series to the outside air. Electric wires 114ª connect the thermo-couples with a voltmeter-like instrument 115, encased in the instrument 110, which actuates a pivoted segment 116 graduated at the bottom in per cent lifting power and on top in degrees Fahrenheit. A fixed arrow 117 points at 0° on the segment 116 when there is no temperature difference between gas and air. As soon as a temperature difference exits, the segment swings out one way or the other, depending on whether the temperature in the gas cell is more or less than that of the air. Should there be a loss of gas in a gas cell, due to whatever cause, then the hand 113 will immediately indicate such loss on the bottom scale of 116. As soon as the loss reaches a certain percentage, then the hand 113, which is electrically connected with the battery 95, will touch a contact 118, adjustably mounted to the segment 116, and a warning signal such as the bell 119 will be sounded. The contact 118 may then be set anew and in case of a gas leak the quantity of gas lost for a given time can be determined.

I do not wish to limit the scope of this invention to the particular types of instruments shown as examples nor to their locations. Especially do I wish to emphasize that the lower level manometer may be located below the free level as indicated on Figure 3, for instance. In this case the line leading to it from the cell must be filled with gas drawn from the cell and it must be non-collapsible since it will carry less than atmospheric pressure. I also wish to point out that for gas cells having the shape of a cylinder with vertical axis direct proportionality prevails between volume, free level height and top pressure. Here the effect of the lower level manometer and of the rheostat sensitive to volume cancel out and the top cell manometer becomes a direct indicator of cell lift. For cells approximately vertically cylindrical, the top cell manometer may give a close approximation to the cell lift.

It is understood that the described function of the instrument is predicated upon the presence of a flabby or slack cell bottom. When the airship reaches pressure height the cell becomes full. Upon further rise all gas vs. air manometers begin to show "overpressure" above what they showed at pressure height. At such an overpressure, when it exceeds a certain margin, the safety valves of the gas cells open and gas escapes. This is immediately indicated by the gas quantity indicator 100, and the loss of lift is indicated by the cell lift indicator. However, these instruments will also respond when the gas escapes, not through valves but through leaks or accidental rips in the cells.

As a matter of terminology, I wish to explain that in the above description of my invention, I have used the word "manometer" to express a differential pressure gauge which indicates the difference of two fluid or gas pressures. The term is to be understood as to be distinct from a sealed pressure gauge which measures absolute pressure, for instance, against vacuum such as a mercury barometer, or an aneroid. I wish to emphasize that the manometric devices forming part of my invention are of the type in which the movable diaphragm or liquid column is exposed to two different pressures on both sides, which difference is only a small fraction of the absolute (barometric) prevailing both in the gas and in the air. A sealed pressure gauge, which is exposed only to the pressure of one gas, for instance, when installed completely within the gas container, would not properly respond to the influence of any variation of outside air pressures such as an airship encounters when rising or descending, or when the weather changes. Such a sealed absolute pressure gauge is not employed in this invention.

Having thus fully described my invention, what I claim and desire to secure by Letters Patent of the United States is:

1. The combination of an airship having at least one gas cell having a flexible bottom portion and adapted to hold a lifting gas, mechanism for indicating the vertical position of the flexible bottom of said cell with said cell containing gas, said mechanism comprising means for measuring the pressure difference between two levels in said cell a known distance apart, means for measuring the pressure difference at at least one of said levels between the gas inside said cell and the air outside said cell, and a ratio meter for combining the measurements of each of said last two mentioned means and including means for indicating the combined result in terms of the level of the flexible bottom portion of said cell.

2. In combination with an expansible gas container of a differential manometer for measuring the pressure difference in said container at two different known levels, comprising a gas-pressure transmitter at the upper known level of said container provided with a flexible diaphragm, a conduit leading to said manometer at one side thereof from said flexible diaphragm and filled with air, a conduit communicating with the interior of said cell at the lower known level of said container and connected to the other side of said manometer, means to determine the inside-outside pressure at one level and a ratio meter having crossed coils, one of which is electrically connected to said manometer and the other of which is electrically connected to said inside-outside pressure-determining means and actuated thereby, whereby to compare the relative values of the inside-outside pressures at one level to the difference in pressures at the two levels, means actuated by said ratio meter and calibrated in conformity to the volume of the gas cell corresponding to the height of the gas level, and a lift meter to which said last-mentioned means and said differential manometer are connected for coaction to indicate the lift of the gas contained in said gas container.

3. A device as set forth in claim 2 in which said ratio meter and lift meter are connected by an energized electrical circuit containing a rheostat and in which the ratio meter varies the resistance in the rheostat to determine the current flowing to said lift meter for actuating the same.

4. In combination with an expansible gas container of a differential manometer for measuring the pressure difference in said container at two different known levels, comprising a gas-pressure transmitter at the upper known level of said container provided with a flexible diaphragm, a conduit leading to said manometer at one side thereof from said flexible diaphragm and filled with air, a conduit communicating with the interior of said cell at the lower known level of said container and connected to the other side of said manometer, means to determine the inside-outside pressure at one level, a ratio meter having crossed coils, one of which is electrically connected to said manometer and the other of which is electrically connected to said inside-outside pressure-determining means and actuated thereby, whereby to compare the relative values of the inside-outside pressures at one level to the difference in pressures at the two levels, means actuated by said ratio meter and calibrated in conformity to the volume of the gas cell corresponding to the height of the gas level, a lift meter to which said last-mentioned means and said differential manometer are connected for coaction to indicate the lift of the gas contained in said gas container, a temperature meter responsive to the difference in temperature between the gas inside said container and the air outside said container, and an adding and subtracting mechanism actuated by said temperature meter coacting with said lift-indicating meter to add to or subtract from the indicated lift of the gas an amount sufficient to cause the lift-indicating meter to indicate the lift under zero temperature differential.

5. In combination, an airship comprising an expansible gas cell, means responsive to the pressure of the gas within said cell at at least two vertically spaced points a known distance apart therein, means responsive to the inside-outside pressure at at least one of said points to measure the pressure difference, and ratio means responsive to each of said two mentioned means for determining and indicating the actual lift of the gas within said cell, and means responsive to the temperature difference between the gas inside said cell and the atmosphere outside said cell for actuating said indicating means proportionally to the difference in inside-outside temperature to indicating the lifting pull of the gas at zero temperature difference.

6. The method of measuring the position of the free gas level within a flexible cell having a loose, freely movable flexible bottom part which comprises the steps of measuring the pressure difference of the gas at two levels in said cell a known distance apart, measuring the pressure difference at at least one of said levels between the gas in said cell and the air outside said cell, and determining the free gas level in accordance with the equation $h_2 = hp_2/(p_1 - p_2)$ wherein $h_2$ = height of free gas level below $p_2$ measuring point, $h$ = height between $p_1$ and $p_2$, $p_1$ = differential pressure between gas inside and air outside of cell at upper measuring point, and $p_2$ = differential pressure between gas inside and air outside of cell at lower measuring point.

7. The combination with an expansible gas container of means for measuring the differential pressure between the outside air and the contained gas at one level in the container, means for measuring the difference in pressure of the gas at the first level and the gas at another level in the container a known distance from the first-named level, a rheostat control means actuated by each pressure measuring means, and cross coil ratio meter means connected with the rheostat control means for indicating a physical characteristic of the gas in the container.

WOLFGANG B. KLEMPERER.